United States Patent [19]
Montgomery et al.

[11] Patent Number: 5,205,952
[45] Date of Patent: Apr. 27, 1993

[54] METHODS FOR CONTROLLING AIRBORNE DISSEMINATION OF LEAD AND LEAD-CONTAMINATED FINES DURING THE STORAGE AND PROCESSING OF LEAD-CONTAMINATED MATERIALS

[75] Inventors: Alistair H. Montgomery, Lakewood; Wolfram H. Kube, Denver, both of Colo.

[73] Assignee: NL Industries, Inc., N.J.

[21] Appl. No.: 760,876

[22] Filed: Sep. 16, 1991

Related U.S. Application Data

[62] Division of Ser. No. 659,243, Feb. 22, 1991, Pat. No. 5,173,277.

[51] Int. Cl.$^5$ .............................................. B08B 7/00
[52] U.S. Cl. ........................................ 252/88; 134/10; 134/42; 429/49
[58] Field of Search ................. 252/88; 429/204, 49; 134/10, 42

[56] References Cited

U.S. PATENT DOCUMENTS

| | | | |
|---|---|---|---|
| 2,443,766 | 6/1948 | Hedberg | 252/88 |
| 3,300,043 | 1/1967 | Adsit | 209/10 |
| 3,393,876 | 7/1968 | Elmore | 241/20 |
| 3,679,395 | 7/1972 | Smyers et al. | 75/695 |
| 3,689,253 | 9/1972 | Dorenfeld et al. | 75/432 |
| 3,883,348 | 5/1975 | Acoveno et al. | 75/432 |
| 4,118,219 | 10/1978 | Elmore et al. | 75/432 |
| 4,135,041 | 1/1979 | Jung et al. | 429/225 |
| 4,180,251 | 12/1979 | Jaquay | 266/172 |
| 4,238,462 | 12/1980 | Hardison | 423/210 |
| 4,310,351 | 1/1982 | Lieberman | 75/693 |
| 4,333,219 | 6/1982 | Ginatta | 29/403.3 |
| 4,340,421 | 7/1982 | Bergsoe | 75/693 |
| 4,341,636 | 7/1982 | Harder et al. | 210/662 |
| 4,428,984 | 1/1984 | Shimizu et al. | 252/88 |
| 4,460,442 | 7/1984 | Ducati | 204/114 |
| 4,551,401 | 11/1985 | Wilson | 252/88 |
| 4,652,381 | 3/1987 | Inglis | 91/61 |
| 4,737,305 | 4/1988 | Dohner | 252/88 |
| 4,769,116 | 9/1988 | Olper et al. | 208/114 |
| 5,034,065 | 7/1991 | Wegner | 252/86 |

FOREIGN PATENT DOCUMENTS 1454984 1/1989 U.S.S.R. .
1085736 10/1967 United Kingdom .

OTHER PUBLICATIONS

Margulis et al., "Hydromettalurgical Recovery of lead from cakes and dists", Tsvetn. Met., 1990, pp. 29–30.

Primary Examiner—Prince Willis, Jr.
Assistant Examiner—James Silbermann
Attorney, Agent, or Firm—Browning, Bushman, Anderson & Brookhart

[57] ABSTRACT

The present invention is directed to improved methods for processing battery wastes, batter casing debris and other lead contaminated materials. The improved processes of the present invention provide less environmentally stressful methods for recovering lead from such materials while at the same time producing scrap or recyclable ebonite and plastics having reduced and environmentally acceptable lead and leachable lead levels. Most of the lead is first removed by trommel scrubbing. In another aspect of the present invention ebonite and other hard surface materials to which are adhered lead contaminants are mixed with water and abraded in a high energy scrubber to remove the adhered contaminants prior to separation of the cleaned ebonite from solution. This simple and environmentally preferred hydromechanical process provides clean scrap or recyclable ebonite. In another aspect of the present invention, plastic and other soft materials contaminated with lead are mixed with a solution having a pH greater than about 7, preferably about 1–5 percent-by-weight alkali hydroxide solution, to dissolve lead contaminants. Separation of particulates produces clean scrap or recyclable plastic while carbonation of the wash water permits recovery of lead carbonate. Finally, the present invention provides methods for controlling dust contamination prior to and during processing by spraying the fine, raw materials with an aqueous solution of a wetting agent, preferably about 2 percent-by-weight alkali carbonate, bicarbonate or sesquicarbonate in water.

8 Claims, 3 Drawing Sheets

METHODS FOR CONTROLLING AIRBORNE DISSEMINATION OF LEAD AND LEAD-CONTAMINATED FINES DURING THE STORAGE AND PROCESSING OF LEAD-CONTAMINATED MATERIALS

This is a division of application Ser. No. 07/659,243, filed Feb. 22, 1991 now U.S. Pat. No. 5,173,277.

BACKGROUND OF THE INVENTION

1. Field of the Invention

The present invention generally relates to methods for removing lead from lead-contaminated wastes and particularly from used lead storage batteries and battery debris piles. More specifically, the present invention is directed to a plurality of environmentally favorable methods useful to control dust and environmental contamination and to recover the removed lead, together with clean scrap/recyclable ebonite, hard rubbers and plastics. The methods of the present invention employ both hydromechanical separation processes and chemical separation processes using more environmentally acceptable chemicals than those employed in the prior art.

2. Description of the Background

Lead acid storage batteries are comprised of a plurality of lead plates immersed in a sulfuric acid electrolyte solution contained within a non-conductive case, typically comprised of plastic or hard rubber, e.g., ebonite. Plates of opposite polarity are insulated from one another by means of porous separators. Electrochemical power is drawn from the plates through conductive lead alloys forming terminals and joined to the plates. The chemically active materials are sponge lead at the cathode and lead dioxide at the anode. When these active materials are electrically connected in the presence of sulfuric acid, an oxidation-reduction reaction creates electrochemical energy and converts the lead materials to insoluble lead sulfate. Water, produced as a by-product of the reaction, reduces the concentration of sulfuric acid. As the lead is converted to lead sulfate and the concentration of electrolyte reduced, the battery output weakens and the used battery is scrapped.

As a result of the oxidation-reduction from which electricity is produced, used or scrapped batteries, in addition to containing lead and lead dioxide, also contain significant quantities of lead sulfate in a weak sulfuric acid solution. Scrap batteries have generally been considered valuable only for their lead content. Accordingly, many patents are directed to methods for recovering the lead from scrap batteries. For example, see U.S. Pat. Nos. 4,118,219, 3,689,253, 3,393,876 and 3,300,043 which disclose various smelting and chemical methods for recovering lead from scrap batteries.

Separate and apart from lead recovery are the environmental problems resulting from used or scrapped batteries, scrap lead and other materials contaminated by lead. As environmental knowledge and standards have increased, the need to process scrap batteries and other lead-contaminated materials has increased. These environmental problems have increasingly become important in connection with the clean-up of manufacturing, storage and scrap sites contaminated by lead. The clean-up and removal of lead contamination from such sites and the materials stored there without producing secondary contamination through windblown, lead-contaminated dust or discharge of water contaminated with lead or other chemicals has taken on a new importance.

Of particular concern is the desire to extract the contaminating lead in a recoverable form while producing scrap material having an acceptable lead content and, particularly, an acceptable extractable or leachable lead content which might permit the recovered materials to be recycled. Accordingly, a need has developed for methods for extracting lead contaminants from the plastic and ebonite portions of used storage batteries. Methods to produce scrap materials, e.g., ebonite and plastics, meeting more stringent leachable lead concentrations, whether merely for scrap or for recycle, have intensified.

The methods of the present invention which provide the ability to recover recyclable materials during the clean-up operations and thus to minimize disposal and storage offer significant advantages over the prior art. The present invention provides methods capable of reducing the leachable lead content of scrap ebonite and plastic below 5 ppm when determined by the Extraction Procedure Toxicity test (EPTox). The EPTox test procedure is set forth at EPA Method 1310. The present invention offers methods for meeting even more rigorous standards, e.g., leachable lead determined by the Toxicity Characteristic Leaching Procedure (TCLP), which may be applied in the future. The TCLP test procedure (EPA Method 1311) is set forth at 40 C.F.R. Part 261, Appendix II.

Accordingly, the present invention has provided methods for meeting the long felt but unfulfilled need for environmentally safe methods of processing lead-contaminated materials and reducing the lead and leachable lead content of various materials, e.g., scrap plastics, ebonite, other hard rubbers and other lead-contaminated materials, to provide clean scrap or recyclable materials.

SUMMARY OF THE INVENTION

The present invention is directed to simple and environmentally preferred methods for processing lead-contaminated materials to reduce the lead and leachable lead content thereof and to separately remove therefrom lead and scrap/recyclable ebonite and plastic materials. The present invention includes methods for improving dust control, for hydromechanical separation and cleaning and for chemical separation employing environmentally favored reagents. The methods of the present invention are particularly useful in the processing of used storage batteries and battery debris piles including various plastic, ebonite and other hard rubber materials contaminated with lead and lead compounds.

In the methods of the present invention the lead-contaminated materials to be processed are initially crushed or ground. These materials generally include plastics, ebonite and other hard rubbers in addition to lead and various lead compounds. The crushed or ground materials are sized by conventional methods to provide raw, contaminated materials which will pass through a 4 inch screen. This material is conveyed to a trommel scrubber where the lead fines are washed from the larger casing fragments with water. On discharge from the trommel, the material is sized using screens to between about 10 mesh and about 1.5 inches for further processing. Oversize materials are returned to the crusher. The undersize material consists of lead concentrate from which the lead is easily removed by conventional methods. The materials which have been sized for further processing comprise ebonite, hard rubbers and plastics with a reduced lead content. It has been found that materials between about 10 mesh and about 1.5 inches improve the handling and yield, particularly of clean, scrap or recyclable ebonite and plastic materials, while reducing fines which must be stabilized for disposal.

After separation of the trommel scrubber wash solution containing the lead fines comprising most of the contaminating lead, the remaining (10 mesh to 1.5 inches) solid materials comprise mostly plastics, ebonite and other hard rubbers still contaminated with lead and lead compounds. A mixture of this contaminated material comprising preferably from about 30 to about 80 percent-by-weight solids in water is vigorously mixed in a high energy scrubber such as an attrition scrubber. High energy scrubbing abrades the lead contaminants from the surface of the ebonite, hard rubbers and other hard surface, polymeric materials. The cleaned ebonite and other hard surface materials are then separated from the wash liquid by conventional screening and floatation separation methods.

Another feature of the present invention are methods to reduce the lead and leachable lead content of scrap/-recyclable plastics and other soft, polymeric materials. While attrition scrubbing in water removes the adhered lead contaminants from ebonites and other hard rubbers, mere attrition scrubbing is insufficient to clean softer materials, e.g., the various plastics often used in the construction of batteries. The present invention offers methods capable of reducing the lead and leachable lead content of these soft materials. The lead-contaminated plastics and other soft materials are contacted with an aqueous solution having a pH greater than 7, preferably greater than 10, to dissolve the lead contaminants therefrom. Preferred solutions are aqueous alkali, alkaline earth or ammonium hydroxide solutions in concentrations of from about 1.0 to about 10 percent-by-weight of the chosen caustic compound. Most preferred is an aqueous solution comprising about 2 percent-by-weight sodium hydroxide. The contaminated plastics and other soft materials conveniently are mixed with the aqueous caustic solution in the attrition scrubber. The cleaned plastic is recovered using conventional screening and floatation separation methods. The dissolved lead is recovered as lead carbonate by conventional carbonation of the filtrate.

Wind blown contamination of off-site soils by lead fines and lead-containing dusts is a significant problem. Another feature of the processes of the present invention are methods for reducing contamination from lead fines and lead-containing dusts dispersed from the raw materials prior to wet processing. It has been found that such contamination is prevented or at least greatly reduced by the application of a wetting agent to the piles of excavated materials and to the grizzly, crusher, feeder and trommel scrubber. Favorable results have been achieved by spraying a dilute, aqueous solution of an inorganic wetting agent over the crushed or ground raw materials. Preferred wetting agents include alkali, alkaline earth and ammonium carbonates, bicarbonates and sesquicarbonates. The most preferred solution is an aqueous solution comprising about 2 percent-by-weight sodium carbonate or sesquicarbonate. In addition to controlling dust and wind blown lead contamination, application of a dilute solution of such wetting agents improves the processing of materials in the trommel scrubber and may improve separation of lead fines, thus helping to reduce the lead content of the remaining plastics, ebonite and hard rubbers prior to further processing.

The processes of the present invention provide various methods for reducing the lead and leachable lead content of lead-contaminated materials, particularly the ebonites, hard rubbers and plastics associated with used storage batteries. While producing cleaned materials of acceptable quality, the methods of the present invention employ hydromechanical and chemical separation methods deemed environmentally favorable relative to those of the prior art. Further, the methods of the present invention minimize further environmental contamination by providing improved dust control and by recycling wash solutions. These and other meritorious features and advantages of the present invention will be more fully appreciated from the following detailed description and claims.

BRIEF DESCRIPTION OF THE DRAWINGS

Other features and intended advantages of the present invention will be more readily apparent by the references to the following detailed description in connection with the accompanying drawings, wherein.

While the invention will be described in connection with the presently preferred embodiment, it will be understood that it is not intended to limit the invention to this embodiment. On the contrary, it is intended to cover all alternatives, modifications and equivalents as may be included in the spirit of the invention as defined in the appended claims.

DETAILED DESCRIPTION OF THE PREFERRED EMBODIMENT

In the methods of the present invention lead-contaminated materials, particularly waste batteries and battery casing debris are processed to reduce the lead and leachable lead content thereof. The processes of the present invention offer methods for controlling lead dust emissions and for reducing the lead and leachable lead content of plastics, ebonites and other hard rubbers to acceptable environmental levels while providing methods for recovering the removed lead.

The methods of the present invention are employable with any lead-contaminated materials. However, these methods have been particularly designed for use with waste storage batteries, battery casing debris and other materials from lead-contaminated sites. The lead contaminants are generally present in the form of lead sulfate, lead oxides, lead carbonate and metallic lead.

The waste batteries, casing debris and other lead-contaminated materials are initially ground or crushed to produce raw materials of a desirable size for processing. It has been found that raw materials which are too large are difficult to process, destructive of the mixing apparatus and produce unsatisfactory results. On the other hand, materials which are too small, i.e., include too many fines, present other processing difficulties, particularly increased dust and unrecyclable materials which must be stabilized for disposal.

Figure 1:
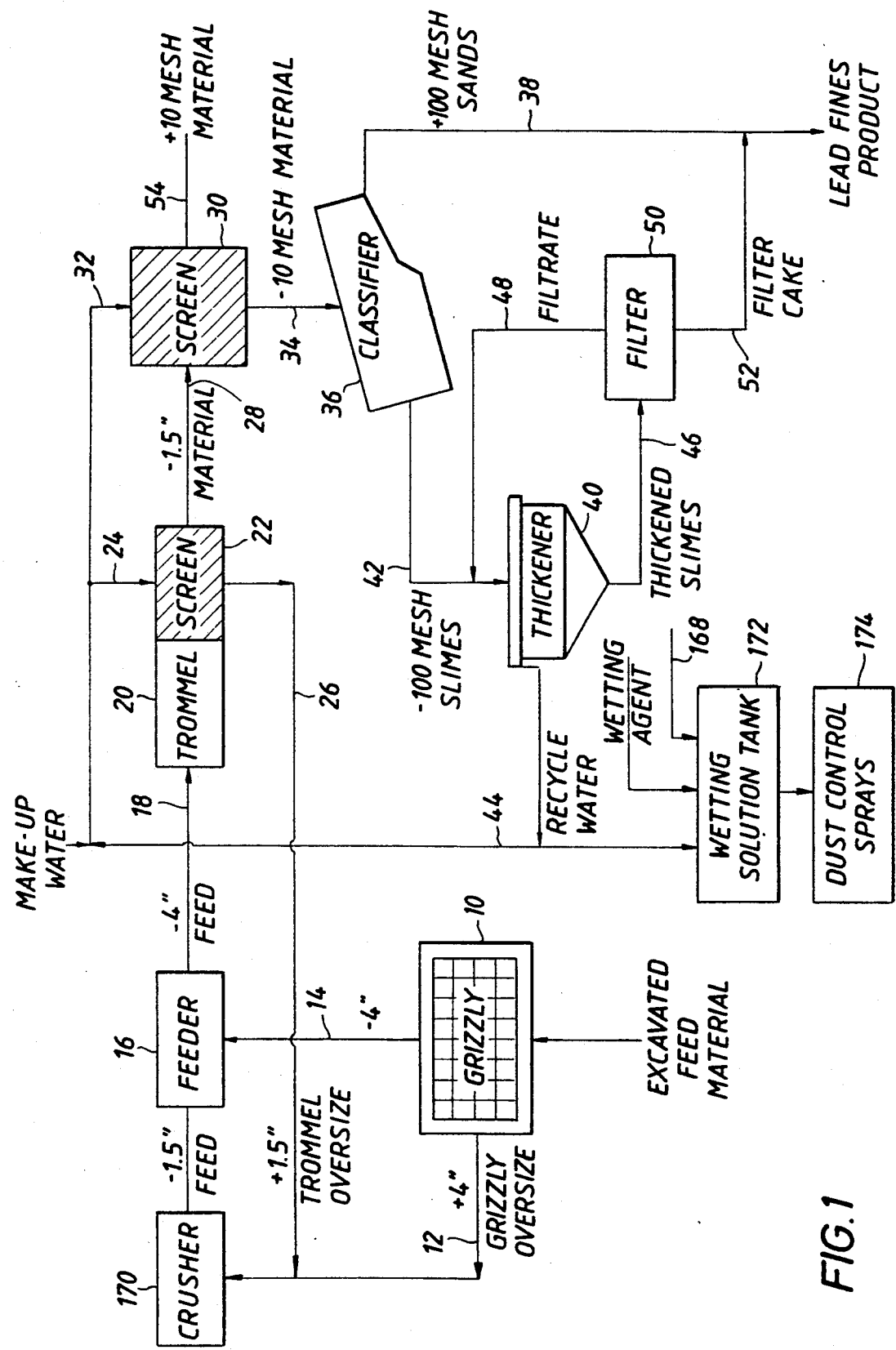
FIG. 1 is a schematic representation of the initial portion of the processes of the present invention illustrating dust control with an aqueous solution of a wetting agent, the sizing of the feed material and the initial separation of lead fines following mixing in a trommel scrubber.

The methods of the present invention will first be described with respect to FIG. 1. The ground or crushed lead-contaminated materials, e.g., waste batteries, battery casing debris and other excavated feed materials, are delivered to grizzly screen 10 for sizing. Those materials which do not pass through the 4 inch screen of grizzly 10 are transported via line 12 to crusher 170 for appropriate grinding or crushing. The materials passing through grizzly 10 move along path 14 to feeder screen 16. Materials which pass through the 4 inch screen of feeder 16 are transported along line 18 to trommel scrubber 20. In trommel scrubber 20 the materials are wetted and admixed with water or an aqueous solution. The average residence time in scrubber 20 is about 30 minutes and can vary from about ten minutes to an hour or more. Mixing typically is performed at ambient pressure and temperature, i.e., about 50° F. to about 80° F. No effort is made to control the temperature. The slurry exits trommel scrubber 20 through screen 22. Material which will not pass through this 1.5 inch screen is returned via line 26 to crusher 170 for further sizing. Material which passes through screen 22 is conveyed via line 28 to screen 30, a 10 mesh separator. Screens 22 and 30 are washed with water or wetting solution from lines 24 and 32, respectively.

The fine material passing through screen 30 is less than about 10 mesh. This fine material is conveyed via line 34 to conventional screw classifier 36 where the larger, i.e., greater than about 100 mesh sands are carried via line 38 for collection of a lead fines concentrate. Most of the lead originally contaminating the raw materials is removed at this step. Lead is recoverable, generally by conventional smelting and refining processes, from this lead fines product. The smaller materials, i.e., less than about 100 mesh fines, are conveyed via line 42 to tank 40 for thickening. These very fine materials are thickened by settling, preferably with the additional of a conventional flocculent, e.g., a polymeric flocculent such as Betz polymer 1159. The thickened fines are delivered from tank 40 to filter 50 via line 46. The filter cake 52 from filter 50 is added to the lead fines product. The filtrate from filter 50 is returned via line 48 to the input to tank 40. Clarified aqueous solution from tank 40 is returned via line 44 to screens 22 and 30 for recycle or to wetting solution tank 172.

It has been found that contamination of the environment by wind blown dust and fines is prevented or at least greatly reduced by the application of a dilute aqueous solution of a wetting agent. The excavated material maintained in storage piles about the site should be so wetted. Wetting is achieved by spraying or misting the raw materials with a dilute aqueous solution of a wetting agent until visibly coated and wetted. Further, it has been found beneficial to spray or mist the wetting solution onto the materials in the grizzly, crusher, feeder and trommel scrubber to minimize dust and achieve maximum benefit. Contact of the raw materials with the dilute aqueous solution of a wetting agent prior to separation in trommel scrubber 20 may also improve removal of lead contaminants into the lead fines product portion exiting the scrubber.

The wetting solution is prepared and stored in tank 172. The solution is prepared using make-up or recycle water delivered through line 44 for mixing with a wetting agent. Additionally, the wash water from the final plastic cleaning process produced at 168 (FIG. 3) may also be used for make-up. The wetting solution is applied by conventional sprayers or misters 174 to the excavated feed material, grizzly 10, crusher 170, feeder 16 and trommel 20. While conventional organic surfactants, e.g., detergents, may be used as wetting agents, they are not preferred due to foaming characteristics and a desire to minimize the environmental impact of the wash solutions. Because of their compatibility with the remaining steps of the process and because of the ability to recycle process solutions, inorganic wetting agents are preferred. Recycle of these solutions significantly reduces the volume of waste water which must be discharged off site and thereby improves the environmental suitability of the processes of the present invention. Preferred wetting agents include the alkali, alkaline earth and ammonium carbonates, bicarbonates and sesquicarbonates. Aqueous solutions comprising about 0.5 percent-by-weight or more wetting agent in water have been found effective. Because little improvement is observed at concentrations greater than about 3 percent-by-weight, preferred concentrations are about 1 to about 3 percent-by-weight. On the basis of field observations, the most preferred solution is presently believed to be an aqueous solution comprising about 2 percent-by-weight sodium sesquicarbonate.

The improvement in dust control achieved by using dilute solutions of an inorganic wetting agent was demonstrated by a simple experiment. Powdered ebonite was prepared by grinding and sizing an ebonite sample to less than about 65 mesh. The sized sample was dried and stored in a sealed container. Sodium carbonate solutions of varying concentrations (0.5, 1.0, 2.0, 3.0 and 6.0 percent-by-weight) were prepared by combining the appropriate weight of sodium carbonate with deionized water. Tests were conducted with a solid:liquid ratio to provide a 20 percent solids slurry. Tests were conducted in 400 ml glass beakers with a magnetic stirrer set at a constant speed to provide vigorous stirring. Each sample was tested by first placing 125 grams of the sodium carbonate test solution in the beaker, adding the stirring bar and activating the stirrer to the predetermined speed. Twenty-five grams of dried and sized, powered ebonite was carefully placed on the surface of the stirring solution. The time from placing the powedered ebonite on the solution until the ebonite was completely drawn into solution, i.e., completely wetted, was measured. Deionized water was run as a control. The results are illustrated in Table I.

TABLE 1

| Sodium Carbonate Concentration (percent-by-weight) | Settling Time (minutes) |
|---|---|
| 0 | 19.0 |
| 0.5 | 7.5 |
| 1.0 | 5.0 |
| 2.0 | 3.0 |
| 3.0 | 2.5 |
| 6.0 | 2.5 |

This test illustrates the remarkable improvement in wetting achieved by using a dilute aqueous solution of an inorganic wetting agent. This test further illustrates that no significant improvement is achieved at concentrations greater than about 2 percent-by-weight.

Figure 2:
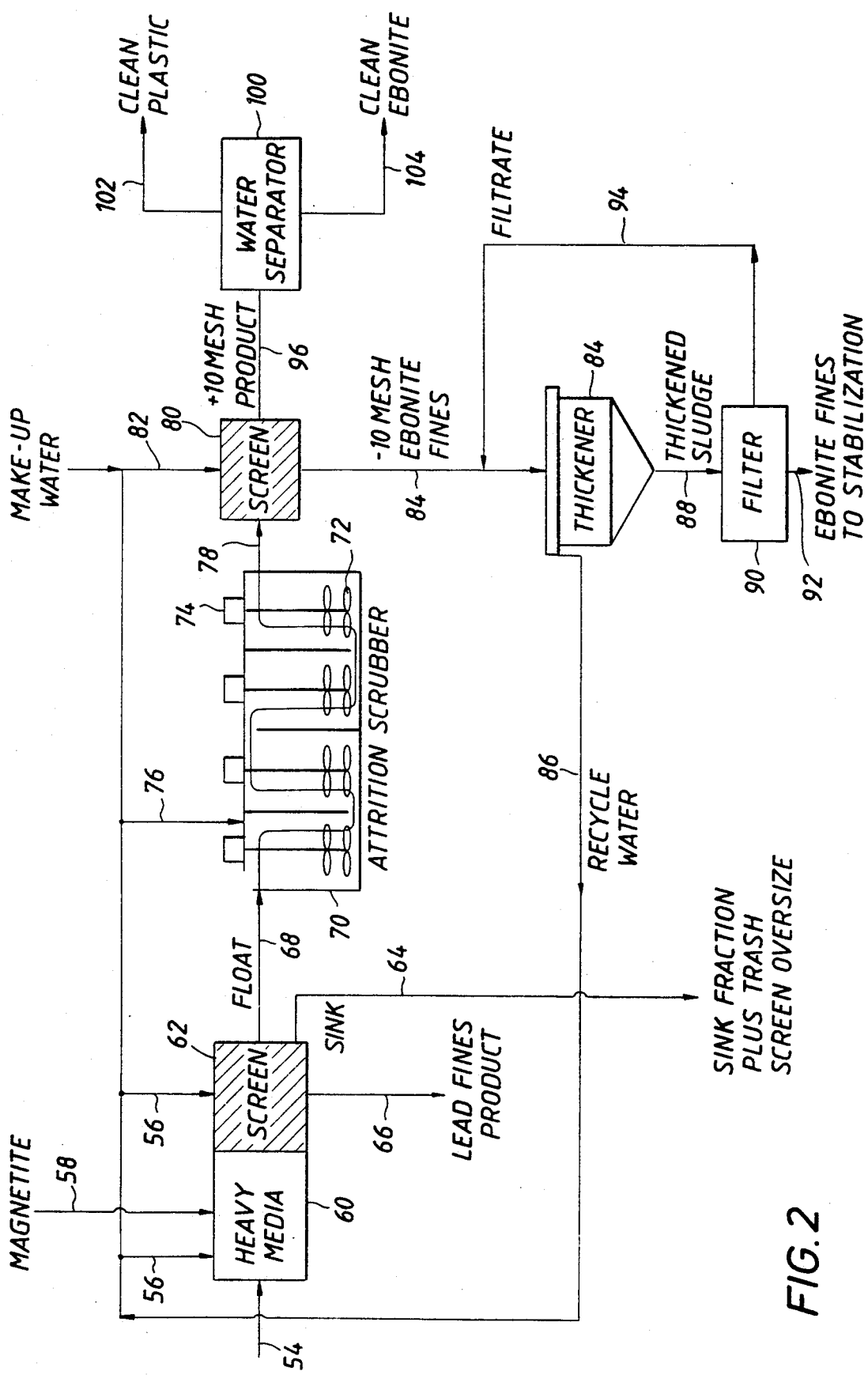
FIG. 2 is a schematic representation of the middle portion of the processes of the present invention illustrating an attrition scrubber used to abrasively and hydromechanically clean adhering lead contaminants from ebonite, hard rubbers and other low density, hard surface materials.

Referring now to FIG. 2, the output from screen 30 comprising material from which most, but not all the lead contamination has been removed and which has been sized to between about 10 mesh and about 1.5 inch is delivered via line 54 to heavy media separator 60 for separation of metallic lead and other heavy materials using magnetite delivered via line 58. Make up water is delivered via lines 56 to separator 60 and screen 62. The materials leaving heavy media separator 60 are passed through screen 62 with the oversized materials being removed by screen 62 and carried away via line 64. The fines from the wash are delivered via line 66 to the lead fines product or to stabilization, depending on the lead content. The remaining float materials comprise essentially the plastics, e.g., polypropylene, polyethylene, PVC and other relatively soft polymerization products, together with low density, hard surface, hard polymerization products, e.g., ebonite and other hard rubbers. These materials are delivered via line 68 to attrition scrubber 70.

Because attrition scrubbing abrades not only the lead contaminants adhered to the surface of the hard polymeric materials, but also a portion of the surface of those materials, size of the starting materials, along with the scrubbing conditions, including scrubbing speed and residence time in the scrubber, are important factors. Proper sizing of the materials, particularly the hard polymeric materials, has been found to be particularly important in recovery of improved yields of recyclable ebonite and other hard rubbers. Minimization of the ebonite fines which must be stabilized for disposal and maximization of cleaned, recyclable ebonite is important to the economics of these cleaning processes. In the past, attrition scrubbers used for processing other materials generally employed smaller materials, i.e., materials sized to be less than about 0.375 inch. It has been found in the present methods that those small starting materials produce an unacceptably low ratio of recyclable scrap to fines which must be stabilized for disposal. Use of larger materials, preferably those as large as about 1 inch to about 1.5 inch increases the ratio of recyclable ebonite to fines. With materials sized to less than about 0.375 inch, the ratio of recyclable ebonite to fines was about 1:1; with materials sized to less than about 1 inch, the ratio of recyclable ebonite to fines increased to about 4:1; and with materials sized to less than about 1.5 inch, the ratio of recyclable ebonite to fines was at least about 5:1.

Attrition scrubber 70 provides a high energy scrubber for vigorous scrubbing of the materials delivered via line 68 from heavy media separator 60. Exemplary attrition scrubbers are manufactured by Denver Equipment Co. in various sizes and with various mixing powers. Attrition scrubber 70 includes a plurality of agitators 72 turned by a plurality of motors 74. In order to achieve vigorous scrubbing it is been found desirable to operate attrition scrubber 70 at between about 800 to about 1500 rpm. Make up water is added to attrition scrubber 70 via line 76. While satisfactory results have been obtained with solid concentrations as high as about 80 percent-by-weight in water and as low as about 30 percent-by-weight, it has been found desirable to operate attrition scrubber 70 with solutions comprising from about 60 to about 80 percent-by-weight solids in water. It is desirable to maintain a high concentration of solids to increase the efficiency of the abrasive scrubbing. However, concentrations which are too high will slow or damage the scrubber. On the other hand, concentrations which are too low do not provide the required abrasive contact. Sufficient lead removal is obtained with residence times in attrition scrubber 70 as low as 15 minutes. While residence times may be up to two hours or more, it has been found desirable to maintain residence times between about 15 minutes and 1 hour, preferably about 30 minutes. While the scrubbing temperature may range between the freezing and boiling points of the scrubbing solution, i.e. water, scrubbing typically is performed at ambient temperature and pressure. Because heat is generated by the vigorous scrubbing and abrasive action and no effort is made to control the temperature, temperatures above ambient are common in scrubber 70.

The output from attrition scrubber 70 is delivered via line 78 to screen 80. Using make-up water delivered from line 82, the cleaned ebonite and plastic materials greater than about 10 mesh are passed via line 96 to conventional water separator 100 where the plastics float higher than the ebonites and are readily separated and removed by conventional means. The clean ebonite is removed from water separator 100 via line 104 while the plastic is removed via line 102 for further processing. Line 84 delivers the wash water from screen 80, including the lead contaminants abraded from the ebonite and the hard rubbers to tank 84 for thickening. Thickening is achieved by settling, preferably with addition of a standard flocculent, e.g., a polymeric flocculent such as Betz polymer 1154. The thickened sludge, including abraded lead contaminants, is conveyed via line 88 to filter 90 from which the filter cake 92, containing the abraded lead contaminants and ebonite fines is removed for stabilization. The filtrate from filter 90 is recycled via line 94 to thickening tank 84. Clarified solution from tank 84 is delivered via line 86 for recycle via inlets 56, 76 or 82 to, respectively, the heavy media separator 60, attrition scrubber 70 or screen 80.

The plastic recovered at 102 after attrition scrubbing with water remains contaminated with lead. It is believed that attrition scrubber 70 is able to effectively clean hard surface materials, e.g., ebonite and hard rubbers, because the contaminating lead which is adhered to and in the porous surface thereof is readily abraded by the vigorous admixing in the attrition scrubber. On the other hand, attrition scrubber 70 is unable to remove sufficient lead contaminants from soft materials, e.g., plastics, which are apparently not readily abraded by the vigorous scrubbing action. Accordingly, it has been found necessary to further process plastic and other soft materials. An additional processing unit may be employed or the material may simply be stockpiled and reprocessed through attrition scrubber 70. This additional processing involves contacting the soft, plastic materials with a basic aqueous solution to dissolve the contaminating lead.

Figure 3:
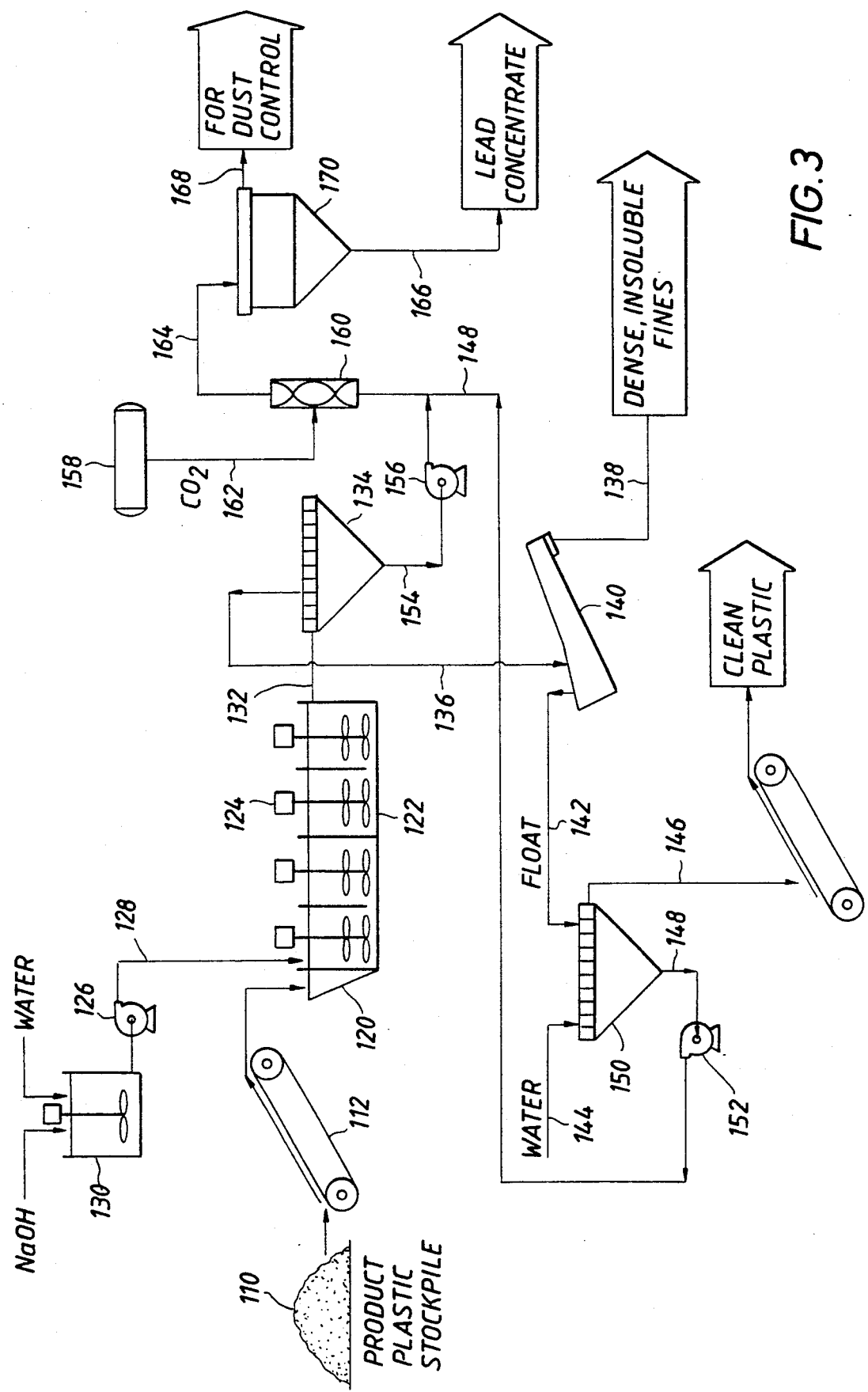
FIG. 3 is a schematic representation of the later portion of the processes of the present invention illustrating the cleaning of lead-contaminated plastics by mixing in an attrition scrubber with an aqueous caustic solution, recovery as lead carbonate of the lead removed in the cleaning process and recycle of the wash solution for dust control.

FIG. 3 illustrates in detail the method for further processing these lead-contaminated plastic materials. Lead-contaminated plastic in stockpile 110 is delivered via conveyor 112 to attrition scrubber 120 for vigorous, high energy scrubbing. Attrition scrubber 120 is equipped with a plurality of agitators 122 driven by a plurality of motors 124. Scrubbing conditions, i.e., mixing speed, temperature, pressure, residence time and the like are the same as discussed above with respect to scrubber 70. Because of the lower density of plastic, it may not be possible to achieve the solids ratio preferred with the ebonites and hard rubbers. Attrition scrubber 120 should be operated with a solids ratio of about 30 to about 80 percent-by-weight solids, and preferably about 30 to about 60 percent-by-weight solids to achieve maximum efficiency of lead dissolution.

The caustic leach solution is prepared in mixing tank 130 and delivered via pump 126 though line 128 to attrition scrubber 120. The leach solution should be at a pH greater than about 7 and preferably greater than about 10. The preferred leaching solution is an aqueous hydroxide solution, preferably an alkali, alkaline earth or ammonium hydroxide, and most preferably sodium hydroxide. The caustic compound, preferably sodium hydroxide, is present between about 0.5 and about 10 or more percent-by-weight in water, more preferably between about 1 and about 5 percent-by-weight, most preferably about 2 percent-by-weight in aqueous solution. The mixture of plastic and solution from attrition scrubber 120 is delivered via line 132 to wash screen 134. The plastic is removed to conventional screw classifier 140 where any residual insoluble materials with densities greater than water are removed via line 138. From classifier 140, the cleaned, plastic material is delivered via line 142 to second screen 150 where wash water from source 144 is added. The cleaned, plastic material floating on screen 150 is removed via line 146 to a clean product receptacle.

The wash water from screen 150 is drained through line 148 and pumped via pump 152 through line 148 for combination with the wash water from screen 134 pumped via line 154 using pump 156. This filtrate comprises the aqueous hydroxide solution containing dissolved lead. This solution is delivered to carbonator 160 where carbon dioxide from tank 158 is added via line 162 to convert the lead to lead carbonate for precipitation and removal. The output of carbonator 160 is delivered via line 164 to tank 170 for thickening by precipitation. The settled lead carbonate may be recovered via line 166 while the clarified solution is drawn from tank 170 via line 168 for use in site dust control (FIG. 1).

Effectiveness of the processes of the present invention may be seen by the following example wherein several different starting materials were treated by the processes of the present invention. The resulting ebonite and plastic materials were analyzed for leachable lead in accord with the EPTox procedure and the results reported in Tables II and III, respectively.

TABLE II

ATTRITION SCRUBBING OF EBONITE WITH WATER*

| | Sample A | | Sample B | | Sample C | |
|---|---|---|---|---|---|---|
| | Lead (ppm) | EPTox Lead (ppm) | Lead (ppm) | EPTox Lead (ppm) | Lead (ppm) | EPTox Lead (ppm) |
| Bench Test: | 450 | 3.5 | 180 | 1.2 | 310 | 0.2 |
| Pilot Test: | 300 | 3.6 | — | — | — | — |
| Bulk Processing: | 400 | 3.6 | 320 | 3.8 | 490 | 2.4 |
| Field Demonstration: | 510 | 2.4 | — | — | — | — |

*Ebonite was scrubbed in water at 60-70 percent-by-weight solids (ebonite) for 30 minutes.

TABLE III

ATTRITION SCRUBBING OF PLASTIC WITH CAUSTIC*

| | Sample D | | Sample E | |
|---|---|---|---|---|
| Scrubbing Time (min.) | Lead (ppm) | EPTox Lead (ppm) | Lead (ppm) | EPTox Lead (ppm) |
| 0 | 3290 | 23.3–36.7 | 2610 | 19.5 |
| 10 | 490 | 10.0 | 700 | 2.1 |
| 20 | 950 | 3.2 | 480 | 0.6 |
| 30 | 500 | 0.9 | 710 | 0.7 |

*Plastic was scrubbed in 2 percent-by-weight sodium hydroxide at 35 percent-by-weight solids (plastic).

The foregoing description of the invention has been directed in primary part to a particular preferred embodiment in accordance with the requirements of the patent statutes and for purposes of explanation and illustration. It will be apparent, however, to those skilled in the art that many modifications and changes in the specifically described system may be made without departing from the true scope and spirit of the invention. Therefore, the invention is not restricted to the preferred embodiments described, but covers all modifications which may fall within the scope of the following claims.

What is claimed is:

1. A method for controlling airborne spreading of lead and lead-contaminated fines and dust from lead-contaminated materials including said fines and dust, comprising:
   wetting the surface of said materials by spraying with an aqueous solution including an effective amount of a wetting agent selected from the group consisting of the inorganic carbonates, bicarbonates, sesquicarbonates and mixtures thereof.

2. The method of claim 1 wherein said wetting agent includes a cation selected from the group consisting of the alkali metals, the alkaline earth metals, ammonium and mixtures thereof.

3. The method of claim 1 wherein said wetting agent is selected from the group consisting of sodium carbonate, sodium bicarbonate, sodium sesquicarbonate and mixtures thereof.

4. The method of claim 1 wherein said solution comprises from about 0.5 to about 3 percent-by-weight wetting agent.

5. The method of claim 3 wherein said solution comprises about 2 percent-by-weight sodium sesquicarbonate.

6. The method of claim 1 wherein said materials are selected from the group consisting of plastics, ebonites, hard rubbers and mixtures thereof.

7. The method of claim 1 wherein said materials comprise fragments of lead storage batteries and battery debris.

8. The method of claim 1 wherein said aqueous solution includes make-up water produced as wastewater in a process for reducing the lead content of lead storage batteries and battery debris.

* * * * *